_(12)_ United States Patent
Duebel et al.

(10) Patent No.: US 7,045,232 B1
(45) Date of Patent: May 16, 2006

(54) FUEL CELL SYSTEM AND METHOD FOR PRODUCING ELECTRIC ENERGY USING A FUEL CELL SYSTEM

(75) Inventors: Olaf Duebel, Isenbuettel (DE); Axel Koenig, Wolfsburg (DE); Per Ekdunge, Göteborg (SE); Peter Alin, Landskrona (SE); Jessica Grace Reinkingh, Frazer, PA (US); Ronald Mallant, Alkmaar (NL)

(73) Assignees: Volkswagen AG, Wolfsburg (DE); AB Volvo, Göteborg (SE)

( * ) Notice: Subject to any disclaimer, the term of this patent is extended or adjusted under 35 U.S.C. 154(b) by 0 days.

(21) Appl. No.: 09/701,064

(22) PCT Filed: May 17, 1999

(86) PCT No.: PCT/EP99/03375

§ 371 (c)(1),
(2), (4) Date: May 4, 2001

(87) PCT Pub. No.: WO99/60646

PCT Pub. Date: Nov. 25, 1999

(30) Foreign Application Priority Data

May 20, 1998 (DE) .......................................... 198 22 689

(51) Int. Cl.
*H01M 8/18* (2006.01)

(52) U.S. Cl. .............................. 429/19; 429/13; 429/12; 429/17

(58) Field of Classification Search .................. 429/19, 429/13, 12, 17
See application file for complete search history.

(56) References Cited

U.S. PATENT DOCUMENTS 5,360,679 A * 11/1994 Buswell et al. ................ 429/19
6,283,723 B1 * 9/2001 Milburn et al. ............. 417/273

FOREIGN PATENT DOCUMENTS

| | | |
|---|---|---|
| DE | 40 32 993 | 5/1992 |
| DE | 43 22 765 | 6/1994 |
| DE | 43 18 818 | 7/1995 |
| DE | 43 29 323 | 7/1995 |
| DE | 196 48 995 | 4/1997 |
| DE | 195 45 186 | 6/1997 |
| DE | 43 45 319 | 7/1997 |
| DE | 196 29 084 | 1/1998 |
| DE | 44 25 634 | 6/1998 |
| DE | 196 35 008 | 11/1998 |
| DE | 195 44 895 | 2/1999 |
| EP | 0 217 532 | 11/1989 |
| EP | 0 356 906 | 3/1990 |
| EP | 0 456 848 | 11/1991 |
| EP | 0 629 013 | 7/1995 |
| EP | 0 629 014 | 7/1995 |
| EP | 0 677 411 | 10/1995 |
| EP | 0 776 861 | 2/1999 |
| JP | 07 057756 | 3/1995 |
| WO | WO 92/07392 | 4/1992 |
| WO | WO 96/00186 | 1/1996 |
| WO | WO 96/20506 | 7/1996 |
| WO | WO 97/10619 | 3/1997 |
| WO | WO 97/16648 | 5/1997 |
| WO | WO 97/21257 | 6/1997 |

* cited by examiner

*Primary Examiner*—Carol Chaney
*Assistant Examiner*—Angela J. Martin
(74) *Attorney, Agent, or Firm*—Kenyon & Kenyon

(57) ABSTRACT

A fuel-cell system, particularly a drive system for a motor vehicle, includes an autothermal reformer unit for producing hydrogen from a raw material in order to operate a downstream fuel cell unit. An oxidation device for converting carbon monoxide into carbon dioxide is arranged between the reformer unit and the fuel-cell unit. The fuel-cell system further includes a two-stage compressor, which supplies a first pressure to a cathode of the fuel cell unit by a first stage and supplies a second pressure to the reformer unit by a second stage.

47 Claims, 1 Drawing Sheet

FUEL CELL SYSTEM AND METHOD FOR PRODUCING ELECTRIC ENERGY USING A FUEL CELL SYSTEM

FIELD OF THE INVENTION

The present invention relates to a fuel-cell system, especially a drive system of a motor vehicle, having a reformer unit for producing hydrogen from a raw material, especially a liquid raw material, while feeding in air, in order to operate a downstream fuel-cell unit. An oxidation device for converting carbon monoxide into carbon dioxide is located between the reformer unit and fuel-cell unit. In addition, the present invention relates to a method for generating electrical energy using a fuel-cell system, especially for a drive system of a motor vehicle hydrogen is produced from a raw material, in a reforming process, as air is fed in, in order to operate a fuel-cell unit; carbon monoxide is oxidized to carbon dioxide after the reforming process and in front of the fuel-cell unit.

BACKGROUND INFORMATION

A catalytic hydrogen generator is described, for example, in European Published Patent Application No. 0 217 532, which produces hydrogen from a methanol-air mixture in an autothermal reformer unit. Located in the reformer unit is a thermocouple, which controls the supply of air to the methanol-air mixture so that the air supply is reduced as the temperature increases at the location of the thermocouple in the reformer.

International Published Patent Application No. WO 96/00186 describes a hydrogen generator the catalyst being positioned around an inlet pipe for the methanol-air mixture, so that the methanol-air mixture flows radially through the catalyst.

German Published Patent Application Nos. 43 45 319 and 43 29 323 each describe a fuel-cell current-generating system, in which hydrogen is produced from a methanol-water mixture in a reformer unit. This hydrogen is supplied to a downstream fuel cell for generating electrical energy. To generate a sufficient amount of heat for the reaction in the reformer, a portion of the methanol is not fed to the methanol-water mixture, but is rather combusted in an additional burner.

An electric vehicle having a driving battery made of fuel cells is described in German Published Patent Application No. 196 29 084, the fuel cells being arranged so that they are cooled by the wind from driving.

In the article "Heureka?" appearing in DE-Z Autotechnik No. 5/1997, on pages 20 to 21, a motor vehicle having a fuel-cell drive is described, where the hydrogen necessary for operating the fuel cells in the vehicle is obtained from gasoline. In this arrangement, the gasoline is converted into hydrogen in a multi-step process. Prior to conversion the gasoline is converted into the gaseous state by heating the gasoline in an evaporator. Hydrogen and carbon monoxide are formed in a partial-combustion reactor under oxygen-deficient conditions. Copper-oxide and zinc-oxide catalysts are provided for oxidizing the carbon monoxide, steam being used to supply oxygen for the reaction. In a further step, a final carbon monoxide concentration of approximately 1% is subsequently burned in a conventional platinum oxidation catalyst. The mixture of hydrogen, carbon monoxide, and carbon dioxide obtained in this manner still contains 10 ppm carbon monoxide, which is not harmful to a downstream fuel cell. After being cooled down to approximately 80 degrees Celsius in a heat exchanger, the gas is lead into the fuel cell.

A similar fuel-cell system for motor vehicles is described in the article "Alternative Fuel" in the Japanese periodical, Asia-Pacific Automotive Report, Jan. 20, 1998, Vol. 272, page 34 to 39, where a methanol reformer unit is provided to produce hydrogen for a fuel cell. In this arrangement, water produced in the electrochemical reaction of hydrogen and oxygen is reused for the reforming process. For the reforming process, deionized water and methanol are mixed, evaporated, and converted into hydrogen and carbon dioxide at a temperature of 250 degree Celsius. This hydrogen is supplied to a fuel cell, which, in a catalytic process, converts the hydrogen, together with atmospheric oxygen, into electrical energy and water. The heat energy necessary for the evaporation and for the reforming process is produced in a catalytic burner, which is located downstream from the fuel cell and is run by residual gas from the fuel cell. This gas contains hydrogen, since the fuel-cell system only utilizes approximately 75% of the supplied hydrogen. If an insufficient quantity of residual hydrogen is available for the catalytic burner, methanol from the fuel tank is used to generate heat for the reformer. Before introducing the gas produced in the reformer, of which a portion is hydrogen, this gas is purified by a catalytic reaction, in which carbon monoxide is converted into carbon dioxide. In a depicted, specific embodiment of a fuel-cell system for a motor vehicle, the methanol reformer includes an evaporator, a reformer, and an oxidation unit for carbon monoxide.

DE 43 22 765 C1 describes a method and a device for dynamically controlling the power output for a vehicle having a fuel cell, which supplies electrical energy to an electrical drive unit. Starting from a power requirement corresponding to the position of an accelerator pedal, a mass flowrate of air is calculated, which is needed by the fuel cell to provide a corresponding, desired power output. The speed of a compressor positioned in an intake line of the fuel cell is controlled as a function of the required air flow rate.

A method and a device for supplying air to a fuel-cell system is described in European Published Patent Application No. 0 629 013. In this arrangement, process air is compressed by a compressor, before it enters a corresponding fuel cell. After process air flows through the fuel cell, the removed exhaust air is expanded over a turbine to recover energy, the turbine, the compressor, and an additional driving motor are arranged on a common shaft. The compressor is designed to have a variable speed and is arranged, along with an expander in the form of a turbine, on a common shaft in order to expand the exhaust air. The air flow rate for the fuel cell is controlled by using an expander having a variable absorption capacity.

A screw-type compressor for a refrigerator is described in International Published Patent Application No. WO 97/16648. This screw-type compressor includes two pump chambers, an outlet of a first pump chamber being connected to a secondary inlet of a second pump chamber.

SUMMARY

The present invention is based on the object of further developing a fuel-cell system so that it can be used more economically and in an environmentally friendlier manner to generate electrical energy, especially for a drive system of a motor vehicle, while operating at high efficiency and occupying a small space.

The above and other beneficial objects of the present invention are achieved by providing a fuel-cell system and a method as described and claimed herein.

The present invention provides for the reformer unit and the fuel-cell unit in a fuel-cell system being assigned a two-stage compressor for air.

This arrangement has the advantage that, despite the different routes and the different stages to be passed through, both the anode and the cathode of the fuel-cell unit can be subjected to the same pressure, which is considerably important for their operation.

Thus, at a first stage of the compressor for supplying air to the cathode of the fuel-cell unit, an air stream having a relatively low pressure is tapped, for example, a pressure of approximately 2.5 to 3.5 bar, and especially a pressure of approximately 3 bar, while at a second stage of the compressor, which is primarily used for supplying air to reformer unit 18 an air stream having a relatively high pressure is tapped, for example, pressure of approximately 3.2 bar to 4.2 bar, and especially a pressure of 3.7 bar. Therefore, pressure losses occurring over the longer path from the reformer unit, via the oxidation unit, to the fuel-cell unit are accounted for from the start, by this increased pressure in the second stage.

Regardless of the absolute magnitude of the selected pressures, the pressure difference between the first and the second stage is approximately 0.5 to 0.9 bar, and especially 0.7 bar.

The two-stage compressor may be in the form of a reciprocating compressor, a screw-type compressor, a centrifugal compressor or the like.

To further improve the economic efficiency and, in particular, the required space, a water-injection device may be provided at the oxidation device, the water injecting device injecting water into the oxidation device.

This has the advantage that, simultaneously to removing carbon monoxide from a process gas, which is from the reformer unit and has a high concentration of hydrogen for the fuel-cell unit, the process gas is sufficiently cooled or precooled, so that it can be directed to the fuel-cell unit without an expensive cooling device or by using a correspondingly less expensive cooling device. In addition, the injected water also supplies oxygen necessary to oxidize carbon monoxide, this oxidation reaction simultaneously releasing hydrogen so that the amount of oxygen having to be supplied separately to the oxidation device can be reduced, and at the same time, the concentration of hydrogen in the process gas is increased. At the same power output, the additional hydrogen enrichment in the oxidation device allows the fuel-cell system to be dimensioned smaller, thereby correspondingly reducing the required space as well as the cost of equipment for the fuel-cell system.

In one embodiment, the reformer unit has a mixer for the raw material and an oxygen-containing substance, especially water and/or air.

A closed water cycle may be attained without having to carry along large amounts of water for the reforming process, in that a water-separation device, especially a condenser, is provided in an exhaust-gas stream from a cathode of the fuel-cell unit and/or in an exhaust-gas stream from an anode of the fuel-cell unit. The condenser removing the water contained in the corresponding exhaust gas and feeding it to a water storage device is connected upstream from the autothermal reformer unit.

An embodiment of the present invention provides a separate water circulation loop, which cools the water-separation devices, the fuel-cell unit, the air supplied to a cathode of the fuel-cell unit, and/or the air supplied to the reformer unit.

To generate the appropriate heat energy necessary for the reaction in the reformer unit, a catalytic burner is provided, which combusts exhaust gas from an anode of the fuel-cell unit and directs the corresponding waste heat through a heat exchanger to the reformer unit.

Alternatively, heat may be generated for the reformer unit by connecting the catalytic burner to a storage tank for the raw material.

Energy can be recovered by providing an expander in a cathode-exhaust stream of the fuel-cell unit and by providing a compressor, particularly a two-stage compressor, in a supply-air stream of the fuel-cell unit, the expander and compressor being arranged on a common shaft.

The raw material may be a substance containing hydrogen, such as, for example, methanol or gasoline.

In a method according to the present invention, air is supplied to the fuel-cell unit, via a first stage of a two-stage compressor, and air is supplied to a reformer unit, via the second stage of the compressor.

This has the advantage that, despite the different routes and the stages to be passed through, both the anode and the cathode of the fuel-cell unit can be subjected to the same pressure, which is considerably important for their operation. Thus, in order to supply air to the cathode of the fuel-cell unit an air stream having a relatively low pressure, for example, a pressure of approximately 2.5 to 3.5 bar, and especially a pressure of approximately 3 bar, is tapped at a first stage of the compressor, while, from a second stage of the compressor, which is primarily used for supplying air to reformer unit 18, an air stream having a relatively high pressure is tapped, for example, a pressure of approximately 3.2 bar to 4.2 bar, and especially a pressure of 3.7 bar. Therefore, pressure losses occurring over the longer path from the reformer unit, via the oxidation unit, to the fuel-cell unit are taken into account from the start, by this increased pressure in the second stage.

To further improve the economic efficiency, and particularly the required space, a water-injection device may be provided at the oxidation device, the water injection device injecting water into the oxidation device.

This has the advantage that, simultaneously with removing carbon monoxide from a process gas, which is from the reforming process and has a high concentration of hydrogen for the fuel-cell unit, the process gas is sufficiently cooled or precooled, so that it can be directed to the fuel-cell unit without an expensive cooling device or by using a correspondingly less expensive cooling device. In addition, the injected water also supplies oxygen necessary to oxidize carbon monoxide, this oxidation reaction simultaneously releasing hydrogen, so that the amount of oxygen having to be separately supplied to the oxidation device can thereby be reduced, and at the same time, the concentration of hydrogen in the process gas can be increased. At the same power output, the additional hydrogen enrichment in the oxidation device allows the fuel-cell system to be dimensioned smaller. This correspondingly reduces the required space, as well as the cost of equipment for the fuel-cell system.

In order for the supply water to achieve a high efficiency, it may be injected in the form of a vapor or aerosol.

An additional increase in the efficiency of the fuel-cell unit can be attained by supplying compressed air to a process gas, between the carbon monoxide oxidation and the fuel-cell unit and/or to a cathode of the fuel-cell unit.

A closed water cycle can be attained without having to carry along large amounts of water for the reforming process, by removing water from a cathode exhaust stream of the fuel-cell unit and/or from an anode exhaust stream of the fuel-cell unit, and supplying the water to the reforming process.

To generate the appropriate heat energy necessary for the reaction of the reforming process, an exhaust gas from an anode of the fuel-cell unit is burned, and the corresponding waste heat is supplied to the reforming process.

Alternatively, heat may be generated for the reformer unit by burning a raw material and supplying the corresponding heat energy to the reforming process.

A hydrogen-containing substance, such as, for example, methanol or gasoline, may be used as a raw material.

DETAILED DESCRIPTION

Figure 1:
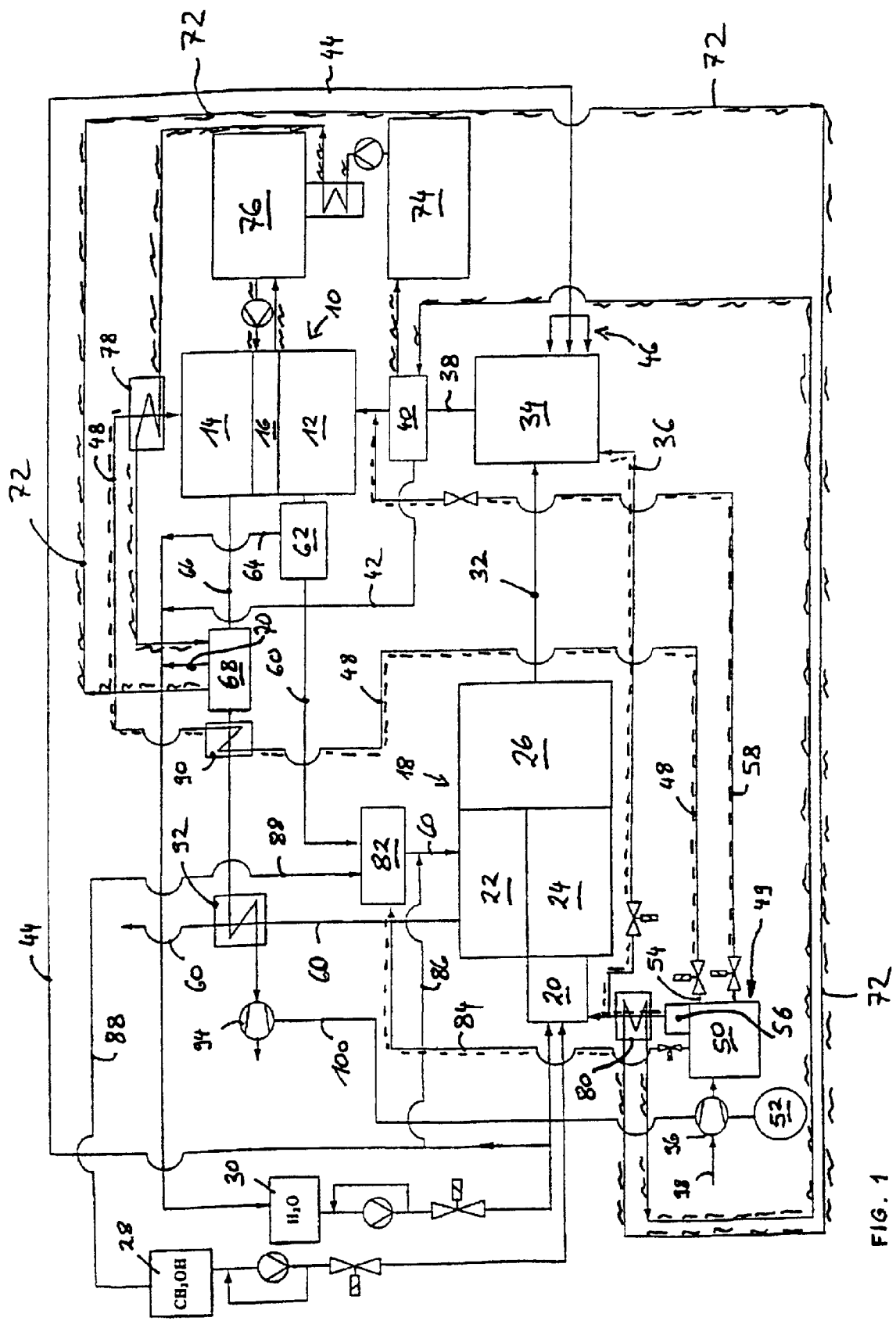
FIG. 1 is a schematic block diagram of an embodiment of a fuel cell system according to the present invention.

In the fuel-cell system illustrated schematically in FIG. 1, hydrogen for a fuel-cell unit 10 having an anode 12, a cathode 14, and a cooling element 16 is produced by an autothermal reformer unit 18, which includes a mixer 20, a heat exchanger 22, an evaporator 24, and a catalytic reformer 26. To produce hydrogen, a raw material, such as, for example, methanol from a methanol tank 28 and water from a water tank 30, are supplied to mixer 20. The mixture of methanol and water is evaporated in evaporator 24, and a process gas in the form of a crude gas 32 having a high hydrogen concentration is generated in a catalytic reaction in catalytic reformer 26.

This crude gas contains, inter alia, carbon monoxide (CO), which must be removed before feeding it into fuel-cell unit 10. Crude gas 32 is directed into an oxidation unit 34, where carbon monoxide is oxidized to carbon dioxide ($CO_2$), in the presence of air supplied by line 36, so that a CO concentration of less than 20 ppm results. At the same time, water from water tank 30 is supplied via a line 44, the supplied water being injected into oxidation unit 34 by an injection device 46. This simultaneously cools the process gas in oxidation unit 34. In an anode-gas condenser 40, the cleaned gas 38 produced and cooled in this manner has water removed from it, which is fed back to water tank 30 via line 42. Cleaned gas 38 having a high concentration of hydrogen is then directed into anode 12 of fuel-cell unit 10. For example, cleaned gas 38 contains 50% $H_2$, 25% $N_2$, and 25% $CO_2$ at a temperature of approximately 180 to 200 degrees Celsius. Before being directed into anode 12, cleaned gas 38 is cooled down, for example, to approximately 85 degrees Celsius in anode-gas condenser 40.

On cathode side 14, compressed air from a compressor 49, designed as a two-stage, screw-type compressor 50, is supplied via line 48 to fuel-cell unit 10. All of the air lines are indicated by dotted lines in FIG. 1. Thus, the fuel-cell unit generates electrical energy in a conventional manner, by the reaction

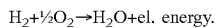

$H_2 + \frac{1}{2}O_2 \rightarrow H_2O + $ el. energy.

This electrical energy can be tapped off at electrodes 12, 14 and supplied to an electric motor 52. Two-stage, screw-type compressor 50 includes a first stage 54 having a pressure of, for example, approximately 3 bar for cathode 14 and a second stage 56 having a pressure of, for example 3.7 bar for the fuel gas, i.e. dehydrated, cleaned gas 38, to be supplied to anode 12. Using another tap on screw-type compressor 50, compressed air is fed via line 58 to cleaned gas 38, downstream from anode-gas condenser 40.

In anode exhaust stream 60 is a water separator 62, which separates water from anode exhaust gas 60 and supplies it via line 64 to water tank 30. In cathode exhaust stream 66 is a condenser 68, which removes water from cathode exhaust gas 66 and supplies it, via line 70, to water tank 30. A closed water circulation loop for the process gas is thus formed, so that large amounts of water do not have to be carried along for the production of hydrogen in reformer unit 18.

A separate water circulation loop 72 indicated by a wavy line is provided to cool the air supplied to mixer 20, to cool anode gas condenser 40, water separator 62, and condenser 68, and to cool the air 48 supplied to cathode 14. This separate water circulation loop 72 includes a cooling-water tank 74, a deionized water tank 76, and corresponding heat exchangers 78 and 80 at cathode 14 air supply 48 and mixer 20 air supply, respectively.

Anode exhaust stream 60 flows into catalytic burner 82, in which anode exhaust gas 60 is further combusted to form heat energy. This heat energy is passed on by heat exchanger 22 to evaporator 24 and catalytic reformer 26, where it sustains the catalytic reaction for producing hydrogen. Air is supplied to catalytic burner 82 by line 84. Downstream from catalytic burner 82, water from water tank 30 may optionally be fed to anode gas 60 by line 86. Alternatively, methanol from methanol tank 28 may be supplied to catalytic burner 82 by line 88, so that even in the case of an insufficient anode exhaust stream 60, for example, during start-up of the fuel-cell system, it is ensured that a sufficient amount of heat energy is generated for reformer unit 18.

Cathode exhaust stream 66 is cooled in a heat exchanger 90 of separate water circulation loop 72 and is then thermally coupled to anode exhaust stream 60 before both exhaust streams 60 and 66 exit the system.

In this case, cathode exhaust stream 66 is directed through an expansion turbine 94 that is positioned, together with a compressor 96 or drawing in air, on a common shaft 100. The compressor is provided as an input stage, in front of two-stage compressor 50. Accordingly, energy contained in cathode exhaust stream 66 is recovered in order to compress air 98 in compressor 96.

A particular advantage of this specific embodiment, which is characterized by a high efficiency, a small space requirement, and a low equipment cost, is achieved by combining two-stage compressor 50 and autothermal reformer unit 18 with the additional injection 46 of cooling water during the selective oxidation of carbon monoxide (CO) in oxidation unit 34 and by combining this with an autonomous water circulation loop 30, 40, 42, 62, 64, 68, 70.

What is claimed is:

1. A fuel-cell system, comprising:
   a reformer unit configured to produce hydrogen from a raw material and inflowing air;
   a fuel-cell unit disposed downstream of the reformer unit, fuel-cell unit being operable in accordance with the hydrogen produced by the reformer unit;
   an oxidation device configured to convert carbon monoxide into carbon dioxide, the oxidation device being located between the reformer unit and the fuel-cell unit; and
   a compressor, one stage of the compressor configured to supply air to the reformer unit and another stage of the compressor configured to supply air to the fuel-cell unit,
   wherein the compressor is configured to compress the air to first pressure and to further compress to a second pressure the air compressed to the first pressure, the compressor tapped at the first pressure to supply the air to the fuel-cell unit and tapped at the second pressure to supply the air to the reformer unit.

2. The fuel-cell system according to claim 1, wherein the fuel-cell system comprises a drive system for a motor vehicle.

3. The fuel-cell system according to claim 1, wherein the raw material includes a liquid raw material.

4. The fuel-cell system according to claim 1, wherein the compressor is configured to supply air tapped to the at the first pressure to a cathode of the fuel-cell unit, the first stage having a lower pressure than the second stage.

5. The fuel-cell system according to claim 1, wherein the compressor includes one of a reciprocating compressor, a screw-type compressor and a centrifugal compressor.

6. A fuel-cell system, comprising:
a reformer unit configured to produce hydrogen from a raw material and inflowing air;
a fuel-cell unit disposed downstream of the reformer unit, the fuel-cell unit being operable in accordance with the hydrogen produced by the reformer unit;
an oxidation device configured to convert carbon monoxide into carbon dioxide, the oxidation device being located between the reformer unit and the fuel-cell unit; and
a two-stage compressor configured to supply air to the reformer unit and the fuel-cell unit,
wherein the two-stage compressor includes a first stage configured to supply air to a cathode of the fuel-cell unit and a second stage configured to supply air to the reformer unit, the first stage having a lower pressure than the second stage, and
wherein the pressure in the first stage is approximately 2.5 bar to 3.5 bar.

7. The fuel-cell system according to claim 6, wherein the pressure in the first stage is approximately 3 bar.

8. A fuel-cell system, comprising:
a reformer unit configured to produce hydrogen from a raw material and inflowing air;
a fuel-cell unit disposed downstream of the reformer unit, the fuel cell being operable in accordance with the hydrogen produced by the reformer unit;
an oxidation device configured to convert carbon monoxide into carbon dioxide, the oxidation device being located between the reformer unit and the fuel-cell unit; and
a two-stage compressor configured to supply air to the reformer unit and the fuel-cell unit,
wherein the two-stage compressor includes a first stage configured to supply air to a cathode of the fuel-cell unit and a second stage configured to supply air to the reformer unit, the first stage having a lower pressure than the second stage, and
wherein the pressure in the second stage is approximately 3.2 bar to 4.2 bar.

9. The fuel-cell system according to claim 8, wherein the pressure in the second stage is approximately 3.7 bar.

10. A fuel-cell system, comprising:
a reformer unit configured to produce hydrogen from a raw material and inflowing air;
a fuel-cell unit disposed downstream of the reformer unit, the fuel cell being operable in accordance with the hydrogen produced by the reformer unit;
an oxidation device configured to convert carbon monoxide into carbon dioxide, the oxidation device being located between the reformer unit and the fuel-cell unit; and a two-stage compressor configured to supply air to the reformer unit and the fuel-cell unit,
wherein the two-stage compressor includes a first stage configured to supply air to a cathode of the fuel-cell unit and a second stage configured to supply air to the reformer unit, the first stage having a lower pressure than the second stage, and
wherein the pressure in the second stage is approximately 0.5 bar to 0.9 bar higher than the pressure in the first stage.

11. The fuel-cell system according to claim 10, wherein the pressure in the second stage is approximately 0.7 bar higher than the pressure in the first stage.

12. The fuel-cell system according to claim 1, wherein the reformer unit includes a mixer configured to mix the raw material and the air.

13. The fuel-cell system according to claim 1, further comprising a water separation device disposed in at least one of an exhaust-gas stream from a cathode of the fuel-cell unit, in an exhaust-gas stream from an anode of the fuel-cell unit and in a cleaned-gas stream from the oxidation unit, the water separating device configured to separate water contained in the corresponding gas and to supply the separated water to a water-storage device disposed upstream of the reformer unit.

14. The fuel-cell system according to claim 13, wherein the water separation device includes a condenser.

15. The fuel-cell system according to claim 13, further comprising a water circulation loop configured to cool at least one of the water separation device, the fuel-cell unit, the air supplied to the cathode of the fuel-cell unit and the air supplied to the reformer unit.

16. The fuel-cell system according to claim 1, further comprising a water injection device configured to injected water into the oxidation unit.

17. The fuel-cell system according to claim 16, wherein the water injection device is provided at the oxidation unit.

18. The fuel-cell system according to claim 1, further comprising a catalytic burner configured to combust exhaust gas from an anode of the fuel-cell unit and to direct corresponding waste heat through a heat exchanger to the reformer unit.

19. The fuel-cell system according to claim 18, wherein the catalytic burner is connected to a supply tank supplying the raw material.

20. The fuel-cell system according to claim 1, further comprising an expander provided in an exhaust-gas stream of a cathode of the fuel-cell unit and a compressor provided in a supply-air stream of the fuel-cell unit, the expander and compressor being arranged on a common shaft.

21. The fuel-cell system according to claim 1, wherein the raw material includes a hydrogen-containing substance.

22. The fuel-cell system according to claim 21, wherein the hydrogen-containing substance includes at least one of methanol and gasoline.

23. A method for generating electrical energy using a fuel-cell system, comprising the steps of:
producing hydrogen from a raw material in a reforming process with inflowing air, a fuel-cell unit of the fuel-cell system, being operable in accordance with the produced hydrogen;
oxidizing carbon monoxide into carbon dioxide after the reforming process and upstream of the fuel-cell unit; and
supplying air to the fuel-cell unit by tapping a compressor at a first pressure and to the reformer unit by tapping the compressor at a second higher pressure, the compressor compressing the air to the first pressure and further compressing the air compressed to the first pressure to the second pressure.

24. The method according to claim 23, wherein the fuel-cell system includes a drive system of a motor vehicle.

25. The method according to claim 23, wherein the air tapped at the first pressure is supplied to a cathode of the fuel-cell unit.

26. The method according to claim 23, further comprising the step of injecting water during the oxidizing step.

27. The method according to claim 26, wherein the water is injected as at least one of a vapor and an aerosol.

28. The method according to claim 23, further comprising the step of supplying compressed air to at least one of a process gas between a carbon dioxide oxidation unit and the fuel-cell unit and a cathode of the fuel-cell unit.

29. The method according to claim 23, further comprising the steps of:
 separating water from at least one of a cathode-exhaust stream of the fuel-cell unit and an anode-exhaust stream of the fuel-cell unit; and
 supplying the separated water to the reforming process.

30. The method according to claim 23, further comprising the steps of:
 burning an exhaust gas from an anode of the fuel-cell unit; and
 supplying waste heat from the exhaust gas burning step to the reforming process.

31. The method according to claim 23, further comprising the steps of:
 burning the raw material; and
 supplying heat energy from the raw material burning step to the reforming process.

32. The method according to claim 23, wherein the raw material includes a hydrogen-containing substance.

33. The method according to claim 32, wherein the hydrogen-containing substance includes at least one of methanol and gasoline.

34. A fuel-cell system comprising,
 a reformer unit configured to produce hydrogen from a raw material and inflowing air;
 a fuel-cell unit disposed downstream of the reformer unit, fuel-cell unit being operable in accordance with the hydrogen produced by the reformer unit;
 an oxidation device configured to convert carbon monoxide into carbon dioxide, the oxidation device being located between the reformer unit and the fuel-cell unit; and
 a multi-stage compressor, one stage of the multi-stage compressor configured to supply air to the reformer unit and another stage of the multi-stage compressor configured to supply air to the fuel-cell unit;
 wherein the fuel-cell unit includes an anode and a cathode subjected to approximately a same pressure.

35. A method for generating electrical energy using a fuel-cell system, comprising the steps of:
 producing hydrogen from a raw material in a reforming process with inflowing air, a fuel-cell unit of the fuel-cell system, being operable in accordance with the produced hydrogen;
 oxidizing carbon monoxide into carbon dioxide after the reforming process and upstream of the fuel-cell unit; and
 supplying air to the fuel-cell unit by a first stage of a multi-stage compressor and to a reformer unit by a second stage of the multi-stage compressor;
 wherein the fuel-cell unit includes an anode and a cathode subjected to approximately a same pressure.

36. A method for generating electrical energy using a fuel-cell system, comprising the steps of:
 producing hydrogen from a raw material in a reforming process with inflowing air, a fuel-cell unit of the fuel-cell system, being operable in accordance with the produced hydrogen;
 oxidizing carbon monoxide into carbon dioxide after the reforming process and upstream of the fuel-cell unit; and
 supplying air to the fuel-cell unit by a first stage of a multi-stage compressor and to a reformer unit by a second stage of the multi-stage compressor;
 wherein the compressor is a screw-type compressor.

37. A fuel-cell system comprising,
 a reformer unit configured to produce hydrogen from a raw material and inflowing air;
 a fuel-cell unit disposed downstream of the reformer unit, fuel-cell unit being operable in accordance with the hydrogen produced by the reformer unit;
 an oxidation device configured to convert carbon monoxide into carbon dioxide, the oxidation device being located between the reformer unit and the fuel-cell unit; and
 a multi-stage compressor, one stage of the multi-stage compressor configured to supply air to the reformer unit and another stage of the multi-stage compressor configured to supply air to the fuel-cell unit,
 wherein the compressor is a screw-type compressor.

38. A fuel-cell system, comprising:
 a reformer unit configured to produce hydrogen from a raw material and inflowing air;
 a fuel-cell unit, including an anode and a cathode, disposed downstream of the reformer unit and operable in accordance with the hydrogen produced by the reformer unit;
 an oxidation device configured to convert carbon monoxide into carbon dioxide, the oxidation device being located between the reformer unit and the fuel-cell unit; and
 a compressor configured to supply air to the reformer unit and the fuel-cell unit such that the anode and cathode are subject to a same pressure.

39. The fuel-cell system according to claim 38, wherein the compressor is a screw-type compressor.

40. A fuel-cell system, comprising:
 a reformer unit configured to produce hydrogen from a raw material and inflowing air;
 a fuel-cell unit disposed downstream of the reformer unit, fuel-cell unit being operable in accordance with the hydrogen produced by the reformer unit;
 an oxidation device configured to convert carbon monoxide into carbon dioxide, the oxidation device being located between the reformer unit and the fuel-cell unit; and
 a screw-type compressor including a first output configured to supply air to the reformer unit at a first pressure and a second output configured to supply air to the fuel-cell unit at a second pressure.

41. The fuel-cell system according to claim 40, wherein the first pressure is approximately 2.5 bar to 3.5 bar.

42. The fuel-cell system according to claim 40, wherein the first pressure is approximately 3 bar.

43. The fuel-cell system according to claim 40, wherein the second pressure is approximately 3.2 bar to 4.2 bar.

44. The fuel-cell system according to claim 40, wherein the second pressure is approximately 3.7 bar.

45. The fuel-cell system according to claim 40, wherein the second pressure is approximately 0.5 bar to 0.9 bar higher than the first pressure.

46. The fuel-cell system according to claim 40, wherein the second pressure is approximately 0.7 bar higher than the first pressure.

47. The fuel-cell system according to claim 40, wherein the second pressure is lower than the first pressure.

* * * * *